US007087554B2

(12) United States Patent
Youngson et al.

(10) Patent No.: US 7,087,554 B2
(45) Date of Patent: *Aug. 8, 2006

(54) DRILLING FLUIDS WITH IMPROVED SHALE INHIBITION AND METHODS OF DRILLING IN SUBTERRANEAN FORMATIONS

(75) Inventors: Arthur Youngson, Abderdeen (GB); Colin Temple, Aberdeen (GB)

(73) Assignee: Halliburton Energy Services, Inc., Duncan, OK (US)

( * ) Notice: Subject to any disclaimer, the term of this patent is extended or adjusted under 35 U.S.C. 154(b) by 284 days.

This patent is subject to a terminal disclaimer.

(21) Appl. No.: 10/411,015

(22) Filed: Apr. 10, 2003

(65) Prior Publication Data

US 2004/0235674 A1 Nov. 25, 2004

(51) Int. Cl.
*C09K 8/12* (2006.01)

(52) U.S. Cl. .................................................... 507/123
(58) Field of Classification Search ................ 507/123
See application file for complete search history.

(56) References Cited

U.S. PATENT DOCUMENTS

| | | | | |
|---|---|---|---|---|
| 2,146,693 A | | 2/1939 | Vietti et al. | |
| 2,165,823 A | | 7/1939 | Vietti et al. | |
| 2,205,609 A | | 6/1940 | Vail et al. | |
| 3,025,234 A | * | 3/1962 | Canterino | 507/119 |
| 3,235,490 A | * | 2/1966 | Goren | 210/728 |
| 3,252,904 A | * | 5/1966 | Carpenter | 166/283 |
| 3,359,225 A | | 12/1967 | Weisend | 260/29.6 |
| 3,504,746 A | * | 4/1970 | Freifeld et al. | 166/295 |
| 3,640,343 A | | 2/1972 | Darley | |
| 3,679,001 A | | 7/1972 | Hill | |
| 3,738,437 A | | 6/1973 | Scheurman | 175/70 |
| 3,746,109 A | | 7/1973 | Darley | |
| 3,843,524 A | | 10/1974 | Perricone et al. | 252/1 |
| 4,033,893 A | | 7/1977 | Mondshine | 252/805 A |
| 4,045,357 A | * | 8/1977 | Reed | 507/123 |
| 4,142,595 A | | 3/1979 | Anderson et al. | 175/72 |
| 4,391,643 A | | 7/1983 | Murphey | |
| 4,440,649 A | | 4/1984 | Loftin et al. | 252/8.5 C |
| 4,460,627 A | | 7/1984 | Weaver et al. | 427/212 |
| 4,466,831 A | | 8/1984 | Murphhey | |
| 4,490,261 A | * | 12/1984 | Heilweil | 507/123 |
| 4,498,994 A | * | 2/1985 | Heilweil | 507/120 |
| 4,514,310 A | * | 4/1985 | Heilweil | 507/229 |
| 4,521,136 A | | 6/1985 | Murphey | |
| 4,532,052 A | | 7/1985 | Weaver et al. | 252/8.55 R |
| 4,536,297 A | | 8/1985 | Loftin et al. | 252/8.5 C |
| 4,625,802 A | | 12/1986 | Sydansk | |
| 4,644,020 A | * | 2/1987 | Stahl | 522/79 |
| 4,741,843 A | | 5/1988 | Garvey et al. | 252/8.514 |
| 4,757,862 A | | 7/1988 | Maiman et al. | 166/295 |
| 4,792,412 A | * | 12/1988 | Heilweil | 507/123 |
| 4,941,981 A | | 7/1990 | Perricone et al. | 252/8.51 |
| 4,988,450 A | | 1/1991 | Wingrave et al. | 252/8.514 |
| 5,035,812 A | * | 7/1991 | Aignesberger et al. | 507/119 |
| 5,198,415 A | | 3/1993 | Steiger | 507/103 |
| 5,208,216 A | | 5/1993 | Williamson et al. | 507/120 |
| 5,211,250 A | | 5/1993 | Kubena, Jr. et al. | |
| 5,635,458 A | | 6/1997 | Lee et al. | 507/240 |
| 5,654,261 A | * | 8/1997 | Smith | 507/269 |
| 6,054,416 A | | 4/2000 | Bland | 507/136 |
| 6,204,224 B1 | | 3/2001 | Quintero et al. | 507/123 |
| 6,248,698 B1 | | 6/2001 | Mullen et al. | 507/140 |
| 6,291,405 B1 | | 9/2001 | Lee et al. | 507/136 |
| 6,422,325 B1 | | 7/2002 | Krieger | 175/50 |
| 6,435,276 B1 | | 8/2002 | Kercheville et al. | 166/255.1 |
| 6,642,183 B1 | | 11/2003 | Bass et al. | |
| 6,716,799 B1 | | 4/2004 | Mueller et al. | |
| 2002/0160919 A1 | | 10/2002 | Stowe, II et al | 507/100 |
| 2004/0204323 A1 | | 10/2004 | Temple et al. | |
| 2004/0235674 A1 | | 11/2004 | Youngson et al. | |

FOREIGN PATENT DOCUMENTS

| | | |
|---|---|---|
| EP | 0 668 339 A1 | 8/1995 |
| GB | 2 267 921 A1 | 12/1993 |
| WO | WO 96/03474 A2 | 2/1996 |
| WO | WO 96/04348 | 2/1996 |
| WO | WO 2004/090067 A2 | 10/2004 |

OTHER PUBLICATIONS

SPE 14248 entitled "Shale Stabilization Principles" by L. E. Nesbitt et al. dated 1985.
Baroid brochure entitled "BARACAT® Shale Stabilizer" dated 2002.
Baroid brochure entitled "BARASIL™ -S Shale Stabilizer" dated 2002.
Baroid brochure entitled "BARO-TROL® PLUS Shale Stabilizer" dated 1999.
Baroid brochure entitled "CLAYSEAL® Shale Stabilizer" dated 2002.
Baroid brochure entitled "EZ-MUD® Shale Stabilizer" dated 2002.
Baroid brochure entitled "GEM™ 2000 Shale Stabilizer" dated 2002.

(Continued)

*Primary Examiner*—Philip C. Tucker
(74) *Attorney, Agent, or Firm*—Craig W. Roddy; Baker Botts L.L.P.

(57) ABSTRACT

The present invention provides improved drilling fluids that comprise improved shale inhibiting components, and methods for using these drilling fluids in connection with drilling in a subterranean formation. The drilling fluids comprise water and an improved shale inhibiting component. Optionally, other additives may be added to the drilling fluids of the present invention, including, inter alia, antifoams, biocides, bridging agents, corrosion control agents, dispersants, flocculants, fluid loss additives, foamers, $H_2S$ scavengers, lubricants, oxygen scavengers, salts, scale inhibitors, viscosifiers, and weighting agents.

31 Claims, No Drawings

OTHER PUBLICATIONS

Baroid brochure entitled HYDRO-GUARD™ Inhibitive Water-Based Fluid Dated 2002.

Foreign communication from a related counterpart application dated Dec. 21, 2004.

Foreign communication from a related counterpart application dated Sep. 9, 2004.

Paper entitled "Connections To Other Fields; Education Issues," by Gary Poehlein, dated 1998.

Paper entitled "Structural Insights into a Novel Molecular-Scale Composite of Soluble Poly(vinyl pyrrolidone) Supporting Uniformly Dispersed Nanoscale Poly(vinyl pyrrolidone) Particles," by David Hood et al., dated 2002.

International Specialty Products paper entitled "New ViviPrint™ Commercially Available," dated 2002.

Zyvek paper entitled "Nanotechnology," by Ralph C. Merkle, dated 2003.

Kodak Research and Development paper entitled "Nanoparticles and You," dated 2003.

Foreign communication from a related counterpart application dated Jun. 1, 2005.

* cited by examiner

DRILLING FLUIDS WITH IMPROVED SHALE INHIBITION AND METHODS OF DRILLING IN SUBTERRANEAN FORMATIONS

BACKGROUND OF THE INVENTION

1. Field of the Invention

The present invention relates to subterranean drilling operations, and more particularly, to drilling fluids demonstrating improved shale inhibition and improved environmental performance, and methods of using such drilling fluids in drilling operations in subterranean formations.

2. Description of the Prior Art

A drilling fluid used in connection with drilling a well in a subterranean formation is any number of fluids (gaseous or liquid) and mixtures of fluids and solids (as solid suspensions, mixtures and emulsions of liquids, gases and solids) used in operations to drill well bores into subterranean formations. Drilling fluids are used to, inter alia, cool the drill bit, lubricate the rotating drill pipe to prevent it from sticking to the walls of the well bore, prevent blowouts by serving as a hydrostatic head to counteract the sudden entrance into the well bore of high pressure formation fluids, and remove drill cuttings from the well bore.

During drilling of subterranean well bores, it is not uncommon to encounter strata comprising reactive shales. As referred to herein, the term "shale" will be understood to mean materials such as certain types of clays (for example, bentonite) and related subterranean materials that may "swell," or increase in volume, when exposed to water. Reactive shales may be problematic during drilling operations because of, inter alia, their tendency to degrade when exposed to aqueous media such as aqueous-based drilling fluids. This degradation, of which swelling is one example, can result in undesirable drilling conditions and undesirable interference with the drilling fluid. For instance, the degradation of the shale may interfere with attempts to maintain the integrity of drilled cuttings traveling up the well bore until such time as the cuttings can be removed by solids control equipment located at the surface. Degradation of drilled cuttings prior to their removal at the surface greatly prolongs drilling time, because shale particles traveling up the well bore break up into smaller and smaller particles, which increasingly exposes new surface area of the shale to the drilling fluid, which leads to still further absorption of water, and further degradation.

Shale disintegration may also adversely impact "equivalent circulation density" ("ECD"). ECD is affected by the solids content of the drilling fluid, which increases if surface solids control equipment cannot remove shale from the drilling fluid. Plastic viscosity (an indicator of size and quantity of solids) is an important parameter in determining drilling rate. Maintenance of appropriate ECD is extremely important in situations where a well is being drilled wherein a narrow tolerance exists between the weight of the drilling fluid needed to control the formation pressure, and the weight of the drilling fluid that will fracture the formation. In such circumstances, minimizing shale degradation provides improved control of the density of the drilling fluid, and enhances the probability of successfully drilling a well bore.

Shale degradation may substantially decrease the stability of the well bore, which may cause irregularities in the diameter of the well bore, e.g., the diameter of some portions of the well bore may be either smaller or greater than desired. In an extreme case, shale degradation may decrease the stability of the well bore to such extent that the well bore will collapse. Degradation of the shale may also, inter alia, interrupt circulation of the drilling fluid, cause greater friction between the drill string and the well bore, or cause the drill string to become stuck in the well bore. Accordingly, the complications associated with shale swelling during drilling may greatly increase the cost of drilling.

A traditional method of inhibiting shale swelling during drilling to attempt to minimize such complications has been to use an oil-based drilling fluid as opposed to an aqueous-based drilling fluid. However, oil-based drilling fluids are often environmentally undesirable because they may be toxic to marine plants and animals. Accordingly, environmental regulations enacted by numerous countries have curtailed the use of oil-based drilling fluids. Consequently, water-based drilling fluids are preferred because they likely have a more benign effect on the environment than oil-based drilling fluids. However, the use of aqueous drilling fluids results in added complications, due to interactions between components of the subterranean formation such as reactive shales and the aqueous fluids.

To counteract the propensity of aqueous drilling fluids to interact with reactive shales in the formation, a shale inhibiting component may be added to the aqueous drilling fluid. As referred to herein, the term "shale inhibiting component" will be understood to mean a compound that demonstrates a propensity for inhibiting the tendency of a sample of shale to absorb water. Amphoteric materials are one type of water-based shale inhibitor that have been used in the past. Amphoteric materials are believed to function, inter alia, by attaching to the shale substrate, thus preventing water ingress. Amphoteric inhibitors are environmentally undesirable, however, especially in heavily regulated areas, because they demonstrate low biodegradability and high toxicity. Potassium chloride is another material that has been utilized as a shale inhibitor. Although potassium chloride is widely used as a shale inhibitor in the North Sea, it is considered to be only moderately effective at inhibiting the swelling of shale. Furthermore, potassium chloride is environmentally unacceptable in other areas of the world. For example, potassium chloride is unsuitable for use in regions such as the Gulf of Mexico, because its concentration of potassium ions is troublesome for certain types of marine life, e.g., shrimp. Potassium chloride is also disfavored in certain regions, such as the Middle East, where wells are drilled in close proximity to aquifers due to concerns that the potassium chloride will contaminate the aquifer. Polyglycols have also been used as shale inhibitors in water-based drilling fluids, but have not reached satisfactory inhibition levels. Partially hydrolyzed polyacrylamides ("PHPA") have also been utilized in many regions, but these have been found to cause formation damage, and are environmentally undesirable.

SUMMARY OF THE INVENTION

The present invention provides improved drilling fluids that comprise improved shale inhibiting components, and methods for using these drilling fluids in connection with drilling in a subterranean formation. Among other things, the shale inhibiting components used in the drilling fluids of the present invention are both environmentally acceptable and largely effective at inhibiting shale swelling during drilling.

One method of the present invention comprises the steps of providing a drilling fluid comprising an aqueous-based fluid and a shale inhibiting component comprising a polymeric heterocyclic nitrogen-containing compound; and placing the drilling fluid in a well bore in a subterranean formation. Another method of the present invention comprises the steps of providing a drilling fluid comprising an aqueous-based fluid and a shale inhibiting component comprising a polymeric heterocyclic nitrogen-containing compound; and placing the drilling fluid in a well bore in a subterranean formation, in contact with a drill bit and the subterranean formation.

One embodiment of the drilling fluids of the present invention comprises water and a shale inhibiting component. Optionally, other additives may be added to the drilling fluids of the present invention, including, inter alia, antifoams, biocides, bridging agents, corrosion control agents, dispersants, flocculants, fluid loss additives, foamers, $H_2S$ scavengers, lubricants, oxygen scavengers, salts, scale inhibitors, viscosifiers, and weighting agents.

The objects, features and advantages of the present invention will be readily apparent to those skilled in the art upon a reading of the description of the preferred embodiments which follows.

DETAILED DESCRIPTION OF PREFERRED EMBODIMENTS

The present invention provides improved drilling fluids comprising improved shale inhibiting components demonstrating improved shale inhibition and acceptable environmental performance, and methods of utilizing these drilling fluids in connection with operations in subterranean zones.

The improved drilling fluids of the present invention generally comprise an aqueous-based fluid, a shale inhibiting component, an optional salt, and other optional additives. In certain preferred embodiments, the improved drilling fluids of the present invention have a density in the range of from about 7 lbs/gallon to about 22 lbs/gallon.

The aqueous-based fluid component of the drilling fluids of the present invention may comprise fresh water, salt water (e.g., water containing one or more dissolved salts), brine (e.g., saturated salt water produced from subterranean formations), or seawater. One of ordinary skill in the art with the benefit of this disclosure will recognize which type of aqueous component is appropriate for a particular application.

The shale inhibiting components used in the drilling fluids of the present invention comprise an "inert element," and an "active element." Examples of the inert elements include, inter alia, water. The active element substantially inhibits degradation of shale in the subterranean formation. The active element preferably comprises polymers derived from heterocyclic compounds comprising nitrogen. The polymers may be crosslinked or non-crosslinked; however, a preferred embodiment comprises crosslinked polymers. Generally, the active element of the shale inhibiting components comprises a polymeric heterocyclic nitrogen-containing compound present in an amount sufficient to inhibit degradation of shale in the subterranean formation. In one embodiment, the heterocyclic nitrogen-containing compound is straight chain polyvinyl pyrrolidone. In another embodiment, the heterocyclic nitrogen-containing compound is crosslinked polyvinyl pyrrolidone. Polyvinyl pyrrolidone has been found to be especially useful for inhibiting shale degradation. An example of a shale inhibiting component comprising crosslinked polyvinyl pyrrolidone used in the drilling fluids of the present invention is commercially available from International Specialty Products of Wayne, N.J., under the tradename "VIVIPRINT 540." On information and belief, VIVIPRINT 540 comprises about 11% crosslinked polyvinyl pyrrolidone by weight. Preferably, the active ingredient of the shale inhibiting component is present in the drilling fluids of the present invention in the range of from about 0.005% by volume to about 0.5% by volume.

The shale inhibiting components may be present in the drilling fluids of the present invention without limit. The proper amount to add may be determined by balancing the cost savings realized by effective inhibition of shale during drilling against the cost of an additional amount of shale inhibitor. One of ordinary skill in the art with the benefit of this disclosure will recognize the appropriate balance for a given application.

The shale inhibiting components may be utilized in subterranean temperatures ranging to about 600° F., due to, inter alia, their temperature stability across a broad range of temperatures.

Optionally, the drilling fluids of the present invention may contain one or more salts. One of ordinary skill in the art with the benefit of this disclosure will recognize the need for caution when combining a salt with a drilling fluid for use in certain regions of the world where such use of a salt may be subject to environmental restrictions. One of ordinary skill in the art with the benefit of this disclosure will also recognize where it is desirable to use a dense brine rather than achieve, inter alia, density with a solid weighting agent. Where the use of a salt is permissible, a variety of salts may be used. Examples of suitable salts include, inter alia, potassium chloride, sodium chloride, potassium formate, potassium carbonate, calcium chloride, and calcium bromide. In certain embodiments, a mixture of suitable salts may be used. In certain embodiments, suitable salts are present in the drilling fluids of the present invention in an amount in the range of from about 5 pounds per barrel to about the salt saturation limit of the drilling fluid.

As will be recognized by those skilled in the art, other additives suitable for use in subterranean well bore drilling operations also may be present in the drilling fluids of the present invention if desired, including, inter alia, antifoams, biocides, bridging agents, corrosion control agents, dispersants, flocculants, fluid loss additives, foamers, $H_2S$ scavengers, lubricants, oxygen scavengers, scale inhibitors, viscosifiers, and weighting agents. One of ordinary skill in the art with the benefit of this disclosure will be able to determine if any of these such additives are needed for a given application.

An example of a preferred drilling fluid of the present invention is a composition of fresh water and 3% VIVIPRINT 540 by volume of the fresh water. Another example of a preferred drilling fluid of the present invention is a composition of fresh water, 3% VIVIPRINT 540 by volume of the fresh water, and 10.5 pounds per barrel ("ppb") potassium chloride. Another example of a preferred drilling fluid of the present invention comprises water, 28 ppb potassium chloride, 0.4 ppb caustic soda, 62 ppb barite, 7 ppb of water-soluble polymers, and 3% VIVIPRINT 540 by volume.

An example of a preferred method of the present invention comprises providing a drilling fluid comprising an aqueous-based fluid and a shale inhibiting component; and placing the drilling fluid in a well bore in a subterranean formation. Another preferred method of the present invention comprises providing a drilling fluid comprising an aqueous-based fluid and a shale inhibiting component; and placing the drilling fluid in a well bore in a subterranean formation, in contact with a drill bit and the subterranean formation.

To facilitate a better understanding of the present invention, the following examples of some of the preferred embodiments are given. In no way should such examples be read to limit the scope of the invention.

EXAMPLE 1

A shale recovery test was performed on samples of various fluids, in order to compare the relative inhibition each fluid demonstrated toward a particular shale sample. This test was intended to mimic the exposure of drilled cuttings to a particular drilling fluid during transport to the surface through a well bore annulus.

A sample of dried shale was ground and sieved through both a 4 mm sieve and a 2 mm sieve. Ground shale particles which passed through the 4 mm sieve but collected on the 2 mm sieve, e.g., shale particles that were sized less than 4 mm but greater than 2 mm, were selected for use in this particular test. For each fluid to be tested, a 20 gram sample of sized shale was weighed and selected.

Next, approximately 350 mL of each fluid to be tested was poured into a bottle. The 20 gram sized shale sample was added to the fluid, and the bottle was capped and shaken to ensure even distribution. The sample was then placed in an oven and hot rolled at 160° F. for 16 hours. When the 16 hour hot roll was complete, the sample was cooled to room temperature.

Next, a large quantity of approximately 20 pounds per barrel ("ppb") potassium chloride solution was prepared. The contents of the sample bottle were then poured onto a 500 micrometer sieve. The inside of the sample bottle was carefully rinsed with the potassium chloride solution, and once more poured onto the 500 micrometer sieve. The bottle was repeatedly rinsed and poured until all shale was removed from the bottle.

Next, the shale retained by the 500 micrometer sieve was carefully washed with the potassium chloride solution. Special care was taken to ensure that none of the sample spilled over the side of the sieve. The washed particles of shale were then washed with water to remove any remnants of the potassium chloride brine. A clean, dry piece of non-absorbent paper was placed on a flat surface, and the 500 micrometer sieve was turned upside down above it. The sieve was tapped to remove the washed particles of shale. A brush was used to remove any shale particles left on the sieve.

The sample was then placed in a pre-weighed Petri dish and transferred to a pre-heated oven at 250° F. to dry to a constant weight. Having dried, the shale sample was then weighed. The percentage recovery of shale for each fluid tested was then determined by the following calculation:

$$\text{Percent Recovered} = \frac{(\text{weight in grams of dried shale recovered})}{20 \text{ grams}} \times 100$$

where the "20 grams" in the denominator refers to the weight of the original shale sample.

The first shale recovery test involved five different fluids and a shale sample consisting of London clay. The test was conducted according to the above procedure. Table 1 below lists the percentage of shale recovery for each fluid tested.

TABLE 1

| Fluid Description | Percent Shale Recovered |
| --- | --- |
| Fluid Sample No. 1 | 2.3 |
| Fluid Sample No. 2 | 13.0 |
| Fluid Sample No. 3 | 96.1 |
| Fluid Sample No. 4 | 50.8 |
| Fluid Sample No. 5 | 6.7 |

Fluid Sample No. 1 consists of an aqueous solution of water and 10.5 ppb potassium chloride. The shale recovery was 2.3%.

Fluid Sample No. 2 consists of an aqueous solution containing 10.5 ppb potassium chloride, and 3% of a conventional amphoteric inhibitor. The shale recovery was 13.0%.

Fluid Sample No. 3 consists of an aqueous solution containing 10.5 ppb potassium chloride and 3% VIVIPRINT 540. The shale recovery was 96.1%.

Fluid Sample No. 4 consists of an aqueous solution containing 10.5 ppb potassium chloride, and 11% sodium silicate. The shale recovery was 50.8%.

Fluid Sample No. 5 consists of an aqueous solution containing 10.5 ppb potassium chloride and 3% polyalkyl glycol. The shale recovery was 6.7%.

The above test thus demonstrates that Fluid Sample No. 3, a drilling fluid of the present invention comprising a type of shale inhibiting component comprising polyvinyl pyrrolidone, provides improved shale inhibition. Although VIVIPRINT 540 was used in these experiments as an embodiment of the improved shale inhibiting components used in the drilling fluids of the present invention, in no way should the invention be read to be limited by its composition. Numerous shale inhibiting components containing an active element comprising a polymeric heterocyclic nitrogen-containing compound are suitable and within the scope of the present invention.

EXAMPLE 2

A second shale recovery test was performed on nine different fluids using a sample of shale from Kristin Field, Norway. The test was conducted according to the procedure described in Example 1 above. Table 2 below lists the percentage of shale recovery for each fluid tested.

TABLE 2

| Fluid Description | Percent Shale Recovered |
| --- | --- |
| Fluid Sample No. 6 | 32.0 |
| Fluid Sample No. 7 | 42.8 |
| Fluid Sample No. 8 | 40.9 |
| Fluid Sample No. 9 | 34.6 |
| Fluid Sample No. 10 | 40.0 |
| Fluid Sample No. 11 | 45.9 |
| Fluid Sample No. 12 | 50.0 |
| Fluid Sample No. 13 | 54.5 |
| Fluid Sample No. 14 | 83.2 |
| Fluid Sample No. 15 | 81.2 |

Fluid Sample No. 6 consists solely of water. The shale recovery was 32.0%.

Fluid Sample No. 7 consists of an aqueous solution containing 35 ppb potassium chloride. The shale recovery was 42.8%.

Fluid Sample No. 8 consists of an aqueous solution containing 35 ppb potassium chloride and 3% polyalkylene glycol by volume. The shale recovery was 40.9%.

Fluid Sample No. 9 consists of an aqueous solution containing 35 ppb potassium chloride and 13% modified silicate by volume. The shale recovery was 34.6%.

Fluid Sample No. 10 consists of an aqueous solution containing 35 ppb potassium chloride, and 12% sodium silicate by volume. The shale recovery was 40.0%.

Fluid Sample No. 11 consists of an aqueous solution containing 35 ppb potassium chloride and 3% amphoteric shale inhibitor by volume. The shale recovery was 45.9%.

Fluid Sample No. 12 consists of an aqueous solution containing 35 ppb potassium chloride and 10 ppb gypsum. The shale recovery was 50.0%.

Fluid Sample No. 13 consists of an aqueous solution containing 35 ppb potassium chloride in 80 ppb sodium chloride. The shale recovery was 54.5%.

Fluid Sample No. 14 consists of an aqueous solution containing 35 ppb potassium chloride, and 3% VIVIPRINT 540 by volume. The shale recovery was 83.2%.

Fluid Sample No. 15 consists of water and 3% VIVIPRINT 540 by volume. The shale recovery was 81.2%.

Thus, Example 2 demonstrates that Fluid Sample No. 14 and Fluid Sample No. 15, which are drilling fluids of the present invention comprising a type of shale inhibiting component comprising polyvinyl pyrrolidone, demonstrate improved shale inhibition.

EXAMPLE 3

A shale recovery test was next performed on eight different fluids using a sample of shale from the Mittelplatte Field in Germany. The shale sample comprised 14% quartz, 2% alkali feldspar, 12% calcite, 1% pyrite, 68% of a mixture of ilite and smectite, and 2% kaolinite. A cation exchange capacity ("CEC") test on the material, performed in accordance with API standard 13-B1, showed the shale to be highly reactive. The test was conducted according to the procedure described in Example 1 above. Table 3 below lists the percentage of shale recovery for each fluid tested.

TABLE 3

| Fluid Description | Percent Shale Recovered |
|---|---|
| Fluid Sample No. 16 | 14.2 |
| Fluid Sample No. 17 | 33.6 |
| Fluid Sample No. 18 | 62.7 |
| Fluid Sample No. 19 | 67.1 |
| Fluid Sample No. 20 | 90.2 |
| Fluid Sample No. 21 | 87.5 |
| Fluid Sample No. 22 | 93.4 |
| Fluid Sample No. 23 | 92.5 |

Fluid Sample No. 16 consists of an aqueous solution containing water, 10 ppb gypsum and 0.3 ppb caustic soda. The shale recovery was 14.2%.

Fluid Sample No. 17 consists of an aqueous solution containing water, 28 ppb potassium chloride and 2% amphoteric shale inhibitor by volume. The shale recovery was 33.6%.

Fluid Sample No. 18 consists of an aqueous solution containing water, 28 ppb potassium chloride and 3% oxyalkylated butanol by volume. The shale recovery was 62.7%.

Fluid Sample No. 19 consists of an aqueous solution containing water, 28 ppb potassium chloride and 3% polyalkyl glycol by volume. The shale recovery was 67.1%.

Fluid Sample No. 20 consists of an aqueous solution containing water, 28 ppb potassium chloride, and 3% VIVIPRINT 540 by volume. The shale recovery was 90.2%.

Fluid Sample No. 21 consists of water, 28 ppb potassium chloride and 12% sodium silicate by volume. The shale recovery was 87.5%.

Fluid Sample No. 22 consists of water, 35 ppb sodium chloride, and 2.5 ppb PHPA. The shale recovery was 93.4%.

Fluid Sample No. 23 consists of water, 28 ppb potassium chloride and 2.5 ppb PHPA. The shale recovery was 92.5%.

Thus, Example 3 demonstrates that Fluid Sample No. 20, a drilling fluid of the present invention comprising a shale inhibiting component comprising polyvinyl pyrrolidone, provides improved shale recovery.

EXAMPLE 4

A shale accretion test was performed on 8 samples of shale from the Mittelplatte field in Germany. The shale sample comprised 14% quartz, 2% alkali feldspar, 12% calcite, 1% pyrite, 68% of a mixture of ilite and smectite, and 2% kaolinite. A CEC test on the material showed the shale to be highly reactive. The test was performed in accordance with the following procedure. Shale from the Mittelplatte field was collected and dried overnight at 110° C. After cooling, the shale was broken down and sieved to obtain "chips" greater than 2 mm in diameter, but less than 4 mm in diameter.

Hot roll cells were set up containing solid pre-weighed cylindrical steel bars with dimensions of 127 mm by 25 mm diameter. Sample compositions of each fluid to be tested were then added to the cells until the fluid height equaled the top of the bar. Sixty grams of Mittelplatte shale chips were then added to each hot roll cell, and gently mixed. The cells were capped, and rolled for thirty minutes at room temperature. Next, the cells were opened, and the bars were carefully removed. The bars were allowed to drain for ten minutes, then the bars were weighed. Shale accretion for each comparative sample was then determined as the net weight of shale added to the bar. The results are reported in Table 4 below.

TABLE 4

| Fluid Description | Shale Accretion (grams) |
|---|---|
| Fluid Sample No. 24 | 0.87 |
| Fluid Sample No. 25 | 1.78 |
| Fluid Sample No. 26 | 1.08 |
| Fluid Sample No. 27 | 1.84 |
| Fluid Sample No. 28 | 5.27 |
| Fluid Sample No. 29 | 9.14 |
| Fluid Sample No. 30 | 19.52 |

Fluid Sample No. 24 consists of an aqueous solution containing water, 28 ppb potassium chloride, 0.5 ppb caustic soda, 65 ppb barite, and 7 ppb of water-soluble polymers. The shale accretion was 0.87 grams.

Fluid Sample No. 25 consists of an aqueous solution containing water, 28 ppb potassium chloride, 0.4 ppb caustic soda, 62 ppb barite, 7 ppb of water-soluble polymers, and 2% amphoteric shale inhibitor by volume. The shale accretion was 1.78 grams.

Fluid Sample No. 26 consists of an aqueous solution containing water, 28 ppb potassium chloride, 0.4 ppb caustic soda, 62 ppb barite, 7 ppb of water-soluble polymers, and 4% oxyalkylated butanol by volume. The shale accretion was 1.08 grams.

Fluid Sample No. 27 consists of an aqueous solution containing water, 28 ppb potassium chloride, 0.4 ppb caustic soda, 62 ppb barite, 7 ppb of water-soluble polymers, and 3% VIVIPRINT 540 by volume. The shale accretion was 1.84 grams.

Fluid Sample No. 28 consists of an aqueous solution containing water, 28 ppb potassium chloride, 38 ppb barite, 7 ppb of water-soluble polymers, and 14.67% sodium silicate by volume. The shale accretion was 5.27 grams.

Fluid Sample No. 29 consists of an aqueous solution containing water, 0.4 ppb caustic soda, 25 ppb bentonite, and 10 ppb gypsum. The shale accretion was 9.14 grams.

Fluid Sample No. 30 consists of an aqueous solution containing water, 35 ppb sodium chloride, 58 ppb barite, and 11 ppb of PHPA. The shale accretion was 19.52 grams.

Thus, Example 4 demonstrates that Fluid Sample No. 27, a drilling fluid of the present invention, comprising a shale inhibiting component comprising polyvinyl pyrrolidone, provides reduced shale accretion as compared to PHPA and sodium silicate.

EXAMPLE 5

A "slake durability" test measures the inhibitive qualities of a water-based drilling fluid under field conditions. Sample compositions of three different fluids were prepared, and exposed to shale from the Alba field in the North Sea, according to the following procedure. First, the shale from the Alba field was ground and sieved until over 300 grams of shale sized to 4–8 mm had been collected. Next, each of three pre-weighed mesh covered cylindrical cells ("cages") received 100 grams of dried shale. The three cages were then placed into baths containing 2.5 liters of the sample composition to be tested. The cages were connected to each other, and to a motor, so that each cage would be rotated. The cages were then rotated for the next 4 hours at 20 rpm at room temperature. The cages were then removed from the baths and briefly washed under running water to remove any remaining components of the test solution. The cages, and the shale still within them, were then dried for at least 16 hours at 95° C. The cages, including the shale, were then weighed. The percentage recovery of shale for each sample composition was then determined by the following calculation:

$$\text{Percent Recovered} = \frac{\text{(final dry weight)}}{\text{(initial dry weight)}} \times 100,$$

where the "initial dry weight" is the weight of the shale placed into a cage, and the "final dry weight" is the total weight of the cage plus dried shale, minus the weight of the empty cage. The results are tabulated below in Table 5.

TABLE 5

| Fluid Description | Slake Durability |
|---|---|
| Fluid Sample No. 31 | 23.3% |
| Fluid Sample No. 32 | 26.6% |
| Fluid Sample No. 33 | 37.0% |

Fluid Sample No. 31 comprises an aqueous solution containing 42 ppb potassium chloride. The slake durability was 23.3%.

Fluid Sample No. 32 comprises an aqueous solution containing 48 ppb potassium formate. The slake durability was 26.6%.

Fluid Sample No. 33 comprises an aqueous solution containing 42 ppb potassium chloride and 3% VIVIPRINT 540 by volume. The slake durability was 37.0%.

Thus, Example 5 demonstrates that Fluid Sample No. 33, a drilling fluid of the present invention, comprising a shale inhibiting component comprising polyvinyl pyrrolidone, provides improved shale recovery.

EXAMPLE 6

The presence of a shale inhibitor within the drilling fluid should preferably have no adverse effect on any other physical or chemical properties of the drilling fluid. Accordingly, a test was performed in which VIVIPRINT 540 was added to a drilling fluid sample, to identify the effect on the original properties of the fluid.

Fluid Sample No. 34 consists of a mixture of 0.448 barrels of sodium chloride brine and 0.418 barrels of potassium chloride brine. To this mixture was added caustic soda in an amount of 0.1 pound/barrel ("ppb"); 8.0 ppb N-DRIL HT PLUS; 3.0 ppb N-VIS P PLUS; 63 ppb BARACARB® 50; and 21 ppb BARACARB® 5. Finally, 3% water by volume was added. N-DRIL HT PLUS is a fluid loss agent commercially available from Halliburton Energy Services, Inc., at various locations. N-VIS P PLUS is a viscosifier commercially available from Halliburton Energy Services, Inc., at various locations. BARACARB® 50, a weighting agent, and BARACARB® 5, a bridging agent, are both commercially available from Halliburton Energy Services, Inc., at various locations.

Fluid Sample No. 35 consists of a mixture of 0.448 barrels of sodium chloride brine and 0.418 barrels of potassium chloride brine. To this mixture was added caustic soda in an amount of 0.1 ppb; 8.0 ppb N-DRIL HT PLUS; 3.0 ppb N-VIS P PLUS; 63 ppb BARACARB® 50; and 21 ppb BARACARB® 5. Finally, 3% VIVIPRINT 540 by volume was added.

Table 6 below lists measurements of the rheology of both Fluid Sample No. 35 and Fluid Sample No. 36 which were determined at 120° F.

TABLE 6

| Fluid Description | Plastic Viscosity (cP) | Yield Point (lb/100 ft²) | 10 Second Gel (lb/100 ft²) | 10 Minute Gel (lb/100 ft²) |
|---|---|---|---|---|
| Fluid Sample No. 34 | 24 | 47 | 12 | 13 |
| Fluid Sample No.35 | 29 | 52 | 11 | 12 |

Table 7 below lists dial readings taken from a Fann Viscometer set at different speeds for both Fluid Sample No. 34 and Fluid Sample No. 35 while the samples were at 120° F.

TABLE 7

| Fluid Description | Viscosity dial reading at 600 rpm | Viscosity dial reading at 300 rpm | Viscosity dial reading at 200 rpm | Viscosity dial reading at 100 rpm | Viscosity dial reading at 6 rpm | Viscosity dial reading at 3 rpm |
|---|---|---|---|---|---|---|
| Fluid Sample No. 34 | 95 | 71 | 60 | 44 | 14 | 12 |
| Fluid Sample No. 35 | 110 | 81 | 67 | 48 | 13 | 11 |

Table 8 below lists physical properties of Fluid Samples No. 34 and No. 35 after both samples had been hot rolled for 16 hours at 250° F. and then cooled to 120° F., except that the API Fluid Loss test was performed at room temperature, in accordance with API 13B-1.

TABLE 8

| Fluid Description | Plastic Viscosity (cP) | Yield Point (lb/100 ft$^2$) | 10 Second Gel (lb/100 ft$^2$) | 10 Minute Gel (lb/100 ft$^2$) | pH | API Fluid Loss (mL/30 min) |
|---|---|---|---|---|---|---|
| Fluid Sample No. 34 | 23 | 53 | 13 | 14 | 10.0 | 1.8 |
| Fluid Sample No. 35 | 31 | 58 | 10 | 12 | 10.1 | 1.5 |

Table 9 below lists dial readings taken from a Fann Viscometer set at different speeds for Fluid Samples No. 34 and No. 35 after both samples had been hot rolled for 16 hours at 250° F. and then cooled to 120° F.

TABLE 9

| Fluid Description | Viscosity dial reading at 600 rpm | Viscosity dial reading at 300 rpm | Viscosity dial reading at 200 rpm | Viscosity dial reading at 100 rpm | Viscosity dial reading at 6 rpm | Viscosity dial reading at 3 rpm |
|---|---|---|---|---|---|---|
| Fluid Sample No. 34 | 99 | 76 | 63 | 48 | 17 | 13 |
| Fluid Sample No. 35 | 120 | 89 | 75 | 54 | 14 | 10 |

Accordingly, Example 6 demonstrates that Fluid Sample No. 35, a drilling fluid of the present invention, comprising a shale inhibiting component comprising polyvinyl pyrrolidone, provides increased viscosity and no loss of properties.

EXAMPLE 7

A linear swell test measures the swelling tendency of shales in different fluid solutions. Shale from the Mittelplatte field in Germany was exposed to sample compositions of four different fluids. The shale sample comprised 14% quartz, 2% alkali feldspar, 12% calcite, 1% pyrite, 68% of a mixture of ilite and smectite, and 2% kaolinite. A CEC test on the material showed the shale to be highly reactive. The test was performed according to the following procedure. First, the Mittelplatte shale was dried overnight in an oven set at 100° C. The next day, the dried shale was ground using a mortar and pestle until the shale had been pulverized. The shale was then sieved through a 200 mesh sieve until a volume sufficient for the test had been collected. Five percent water by weight was added, and mixed with the sieved shale.

Next, twenty grams of shale were weighed out four times, once for each fluid to be tested. Each of the ground, sieved shale samples was then reconstituted through the use of a hydraulic compactor unit, producing four compacted "cores" of shale. Each compacted core was then laterally confined within a porous sleeve to minimize radial swelling once exposed to a fluid sample. The compacted, sleeved cores were then placed in cups filled with a particular fluid sample, and the resultant linear swelling was recorded by a transducer and displayed graphically on an adjacent monitor. The test was permitted to continue until all four swelling curves reached a plateau, indicating that no further swelling would occur.

Fluid Sample No. 36 consists of an aqueous solution containing water, 0.4 ppb caustic soda, 25 ppb bentonite, and 10 ppb gypsum. The linear swelling of this sample was 27.5%.

Fluid Sample No. 37 consists of an aqueous solution containing water, 28 ppb potassium chloride, 0.4 ppb caustic soda, 62 ppb barite, 7 ppb of water-soluble polymers, and 2% amphoteric shale inhibitor by volume. The linear swelling of this sample was 16.5%.

Fluid Sample No. 38 consists of an aqueous solution containing water, 28 ppb potassium chloride, 0.4 ppb caustic soda, 62 ppb barite, 20 ppb of water-soluble polymers, and 4% oxyalkylated butanol by volume. The linear swelling of this sample was 14.2%.

Fluid Sample No. 39 consists of an aqueous solution containing water, 28 ppb potassium chloride, 0.4 ppb caustic soda, 62 ppb barite, 7 ppb of water-soluble polymers, and 3% VIVIPRINT 540 by volume. The linear swelling of this sample was 15.1%.

Accordingly, Example 7 demonstrates that Fluid Sample No. 39, a drilling fluid of the present invention, comprising a shale inhibiting component comprising polyvinyl pyrrolidone, is a suitable shale inhibitor.

EXAMPLE 8

The environmental acceptability of aqueous drilling and workover fluids is typically related to the toxicity, biodegradability and bio-accumulation potential of individual products. Polyvinyl pyrrolidones have been used widely in the health and personal care industries since the 1950s as viscosifiers for synthetic blood plasma and haircare products. Accordingly, polyvinyl pyrrolidones are known to pose minimal risk to humans when inhaled or injected. To further quantify the low toxicity of compositions of the present invention, a preferred shale inhibiting component used with the fluid systems of the present invention was subjected to a battery of environmental tests, the results of which are reported in Table 10 below.

inhibiting component's $LC_{50}$ when it is administered to a member of that species. The aquatic toxicity test on a species of juvenile turbot was carried out in accordance with the OSPARCOM 1995 OECD 203 protocol, and measures the shale inhibiting component's $LC_{50}$ when it is administered to a juvenile turbot. To satisfy the testing requirements, a component must demonstrate an $LC_{50}$ greater than 10 mg/L. The $EC_{50}$ for *skeletonema* was determined to be 89.7 mg/L, the $LC_{50}$ for *acartia tonsa* was determined to be 972 mg/L, and the $LC_{50}$ for juvenile turbot was found to be 960 mg/L.

The biodegradability test was conducted according to the OECD 306 protocol and measures the decomposition of the shale inhibiting component by bacteria or other living organisms over 28 days. The biodegradability of Sample Composition No. 40 was found to be 29%, which satisfies the testing requirement that the biodegradability exceed 20%. Accordingly, Sample Composition No. 40 merits a rating of "inherently biodegradable" under the Oslo and Paris Commission ("OSPARCOM") Harmonized Offshore Chemical Notification Format.

The bioaccumulation test was conducted according to the OECD 117 protocol. Generally speaking, the test partitions a sample composition between octanol and water, determines the concentration of the sample composition in each phase, and produces a logarithm of the partition coefficient between the two phases. The bioaccumulation of Sample Composition No. 40 was found to be below the detection limits of the measuring equipment.

Accordingly, Example 8 demonstrates that the shale inhibiting components in the drilling fluids of the present invention are compatible with environmental regulations.

TABLE 10

| | Sediment Toxicity [corophium volutator] (mg/L) | Aquatic Toxicity [skeletonema] (mg/L) | Aquatic Toxicity [acartia tonsa] (mg/L) | Aquatic Toxicity [juvenile turbot] (mg/L) | Bio-degradability | Bio-accumulation |
|---|---|---|---|---|---|---|
| Sample Composition No. 40 | >10,000 | 89.7 | 972 | 960 | 29% | Low |

Sample Composition No. 40 consists of a shale inhibiting component used with the drilling fluids of the present invention, comprising 100% VIVIPRINT 540.

The sediment toxicity test was carried out in accordance with the PARCOM 1995 protocol, and determines the shale inhibiting component's $LC_{50}$ when exposed to the species *corophium volutator*—e.g., the concentration of the shale inhibiting component that is estimated to be lethal to 50% of *corophium volutator*. To satisfy the testing requirements, a component must demonstrate an $LC_{50}$ greater than 10 mg/L. The $LC_{50}$ of Sample Composition No. 40 was determined to be greater than 10,000 mg/L—i.e., the shale inhibiting component is not lethal to 50% of the test species unless the concentration of the shale inhibiting component exceeds 10,000 mg/L.

The aquatic toxicity test on the species *skeletonema costatum* was carried out in accordance with the ISO/DIS 10253 protocol, and determines the shale inhibiting component's $EC_{50}$ when it is administered to a member of the species *skeletonema costatum*. The aquatic toxicity test on the species *acartia tonsa* was carried out in accordance with the ISO/TC147/SC5/WG2 protocol, and measures the shale In several embodiments, the presence of the shale inhibiting components in the drilling fluids of the present invention has been found to measurably improve both the lubricity and the viscosity of the drilling fluids. As a result, reduced amounts of lubricant and viscosifier may be needed.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of using a drilling fluid in a subterranean formation comprising shale comprising the steps of: providing a drilling fluid comprising an aqueous-based fluid, and crosslinked polyvinyl pyrrolidone; and using the drilling fluid to drill a well bore in a subterranean formation.

2. The method of claim 1 wherein the crosslinked polyvinyl pyrrolidone is present in a concentration sufficient to inhibit the degradation of shale.

3. The method of claim 1 wherein the crosslinked polyvinyl pyrrolidone is present in the drilling fluid in an amount in the range of about 0.005% to about 0.5% by volume of the drilling fluid.

4. The method of claim 1 wherein the drilling fluid further comprises a salt.

5. The method of claim 4 wherein the salt is present in an amount in the range of about 5 pounds per barrel to about the salt saturation limit of the drilling fluid.

6. The method of claim 4 wherein the salt comprises potassium chloride, calcium chloride, sodium chloride, potassium formate, calcium bromide, potassium carbonate, or a mixture thereof.

7. The method of claim 1 wherein the drilling fluid further comprises antifoams, biocides, bridging agents, corrosion control agents, dispersants, flocculants, fluid loss additives, foamers, $H_2S$ scavengers, lubricants, oxygen scavengers, scale inhibitors, viscosifiers, or weighting agents.

8. The method of claim 1 wherein the density of the drilling fluid is within the range of from about 7 lb/gallon to about 22 lb/gallon.

9. The method of claim 1 wherein the aqueous-based fluid is fresh water.

10. A method of using a drilling fluid in a subterranean formation comprising shale comprising the steps of: providing a drilling fluid comprising an aqueous-based fluid, and crosslinked polyvinyl pyrrolidone; and placing the drilling fluid in a well bore in a subterranean formation; wherein the density of the drilling fluid is within the range of from about 7 lb/gallon to about 22 lb/gallon, wherein the crosslinked polyvinyl pyrrolidone is present in an amount in the range of from about 0.005% to about 0.5% by volume of the drilling fluid, and wherein the drilling fluid further comprises potassium chloride in an amount in the range of from about 5 ppb to about the salt saturation limit of the drilling fluid.

11. A method of drilling a well in a subterranean formation comprising shale comprising the steps of: providing a drilling fluid comprising water, and crosslinked polyvinyl pyrrolidone; and placing the drilling fluid within a well bore in contact with a drill bit and a subterranean formation.

12. The method of claim 11 wherein the crosslinked polyvinyl pyrrolidone is present in a concentration sufficient to inhibit the swelling of shale.

13. The method of claim 11 wherein the crosslinked polyvinyl pyrrolidone is present in an amount in the range of about 0.005% to about 0.5% by volume of the drilling fluid.

14. The method of claim 11 wherein the drilling fluid further comprises a salt.

15. The method of claim 14 wherein the salt is present in an amount in the range of about 5 pounds per barrel to about the salt saturation limit of the drilling fluid.

16. The method of claim 14 wherein the salt comprises potassium chloride, sodium chloride, calcium chloride, potassium formate, potassium carbonate, calcium bromide, or any mixture thereof.

17. The method of claim 11 wherein the drilling fluid further comprises antifoams, biocides, bridging agents, corrosion control agents, dispersants, flocculants, fluid loss additives, foamers, H2S scavengers, lubricants, oxygen scavengers, scale inhibitors, viscosifiers, or weighting agents.

18. The method of claim 11 wherein the density of the drilling fluid is within the range of from about 7 lb/gallon to about 22 lb/gallon.

19. The method of claim 11 wherein the aqueous-based fluid is fresh water.

20. A method of drilling a well in a subterranean formation comprising shale comprising the steps of: providing a drilling fluid comprising water, and crosslinked polyvinyl pyrrolidone; and placing the drilling fluid within a well bore in contact with a drill bit and a subterranean formation; wherein the density of the drilling fluid is within the range of from about 7 lb/gallon to about 22 lb/gallon, wherein the crosslinked polyvinyl pyrrolidone is present in an amount in the range of from about 0.005% to about 0.5% by volume of the drilling fluid, and wherein the drilling fluid comprises potassium chloride in an amount in the range of from about 5 pounds per barrel to about the salt saturation limit of the drilling fluid.

21. A method of enhancing the shale inhibition of an aqueous-based drilling fluid, comprising the steps of adding crosslinked polyvinyl pyrrolidone to the drilling fluid; and using the drilling fluid comprising crosslinked polyvinyl pyrrolidone to drill a well bore in a subterranean formation.

22. The method of claim 21 wherein the crosslinked polyvinyl pyrrolidone is present in a concentration sufficient to inhibit the swelling of shale.

23. The method of claim 21 wherein the crosslinked polyvinyl pyrrolidone is present in an amount in the range of about 0.005% to about 0.5% by volume of the drilling fluid.

24. The method of claim 21 wherein the drilling fluid further comprises a salt.

25. The method of claim 24 wherein the salt is present in an amount in the range of about 5 pounds per barrel to about the salt saturation limit of the drilling fluid.

26. The method of claim 24 wherein the salt comprises potassium chloride, sodium chloride, calcium chloride, calcium bromide, potassium formate, potassium carbonate or any mixture thereof.

27. The method of claim 21 wherein the drilling fluid further comprises antifoams, biocides, bridging agents, corrosion control agents, dispersants, flocculants, fluid loss additives, foamers, $H_2S$ scavengers, lubricants, oxygen scavengers, scale inhibitors, viscosifiers, or weighting agents.

28. The method of claim 21 wherein the density of the drilling fluid is within the range of from about 7 lb/gallon to about 22 lb/gallon.

29. The method of claim 21 wherein the aqueous-based fluid is fresh water.

30. A method of enhancing the shale inhibition of an aqueous-based drilling fluid, comprising the step of adding crosslinked polyvinyl pyrrolidone to the drilling fluid; wherein the density of the drilling fluid is within the range of from about 7 lb/gallon to about 22 lb/gallon, wherein the crosslinked polyvinyl pyrrolidone is present in an amount in the range of from about 0.005% to about 0.5% by volume of the drilling fluid, and wherein the drilling fluid comprises potassium chloride in an amount in the range of from about 5 pounds per barrel to about the salt saturation limit of the drilling fluid.

31. A drilling fluid for use in drilling a well in a subterranean formation comprising water and crosslinked polyvinyl pyrrolidone, wherein the density of the drilling fluid is within the range of from about 7 lb/gallon to about 22 lb/gallon, wherein the crosslinked polyvinyl pyrrolidone is present in an amount in the range of from about 0.005% to about 0.5% by volume of the drilling fluid, and wherein the drilling fluid comprises potassium chloride in an amount in the range of from about 5 pounds per barrel to about the salt saturation limit of the drilling fluid.

* * * * *